United States Patent Office 3,272,706
Patented Sept. 13, 1966

3,272,706
CRYSTALLIZATION OF ACTINOSPECTACIN SULFATE WITH METHANOL
Vincent J. Peters, Morris Plains, N.J., assignor to The Upjohn Company, Kalamazoo, Mich., a corporation of Delaware
No Drawing. Filed Aug. 2, 1961, Ser. No. 128,687
4 Claims. (Cl. 167—65)

This invention pertains to a novel chemical process, and more particularly it pertains to an improved method for crystallizing actinospectacin sulfate from solutions containing the same. Still more particularly, the invention is directed to the process wherein crystallization of substantially pure actinospectacin sulfate is effected from concentrated aqueous solutions containing the same by addition of methanol.

Actinospectacin is a basic compound elaborated by the microorganism *Streptomyces spectabilis* under controlled culture conditions in a nutrient medium. The compound is active against microorganisms, particularly bacteria; and it can be used in the form of the free base or in the for of acid addition salts to control microorganisms. For example, actinospectacin, or its salts, can be incorporated in a wash solution for cleansing the person, as well as contaminated surfaces of buildings, furnishings, and laboratory equipment. Moreover, it has been found that actinospectacin and its salts are active either alone or in conjunction with other antibiotics when formulated with feed nutrients for stimulating the growth of mammals and birds. It can also be used for selective control of microorganisms in biologic media and as an industrial preservative, for example, as an antiseptic impregnant of laundered clothing, paper products, and fabrics.

Various methods for the production, recovery, and purification of actinospectacin are described in Belgium Patent No. 596,175; but heretofore, a satisfactory process for direct solvent crystallization of actinospectacin sulfate from cation exchange resin eluates was not known. This invention, therefore, provides a notable advance in the art since it is now not only possible to obtain highly purified crystals of actinospectacin sulfate from such eluates containing only about 2% to about 10% of the antibiotic, but other simplifications in the recovery procedure are possible. For example, prior to this invention, when the antibiotic was eluated from a cation exchange resin with sulfuric acid, the excess acid in the eluate was neutralized with an anion exchange resin in order to prevent an undesirable proportion of ash in the product. This procedure was time consuming and laborious. Now such acid eluates can be rapidly and conveniently neutralized with base, and the resulting base metal sulfate salt is precipitated by the methanol as a part of the crystallization step, which precipitate can be separated in accordance with the new process before the actinospectacin sulfate itself begins to crystallize.

The concentration of actinospectacin in aqueous solutions is determined by assaying its activity against the microorganism *Klebsiella pneumoniae* by standard agar diffusion procedures as described by L. J. Hanka et al., Antibiotics and Chemotherapy, 11, pp. 124–126, 1961. The assays reported herein are based on the content of actinospectacin free base.

Advantageously, concentrated solutions of actinospectacin sulfate for crystallization in accordance with the process of this invention are prepared from whole beer by the following preferred procedure:

A whole beer is acidified to less than about pH 3.5 and filtered. The acidification is advantageously accomplished with a strong oxidizing mineral acid, for example, concentrated sulfuric acid (preferred), hydrochloric, phosphoric, and the like. The filtered beer is then adjusted to about pH 5.5 to pH 7.0 with a base, for example, sodium hydroxide, sodium carbonate, and like bases, and 1 to 8 mgs., preferably 2 to 4 mgs., of ethylenediamine tetraacetic acid is added per ml. of beer. The ethylenediamine tetraacetic acid may be added in the acid form or in the form of its salts, e.g., alkali metal salts such as the sodium salt. When the acid form of ethylenediamine tetraacetic acid is used, the filtered beer is advantageously reneutralized by additional base in order to maintain the pH at about pH 5.5 to 7.0, preferably, pH 6.5 to 7.0. The treated beer is then brought into contact with a cation exchange resin in, for example, the hydrogen, the sodium, and like forms. Various carboxylic acid resins can be used. Suitable resins includes the polyacrylic acid resins obtained by the copolymerization of acrylic acid and divinylbenzene by the procedure described in "Ion Exchange Resins," Kunin, p. 87 (1958, 2nd ed.), John Wiley and Sons, Inc., N.Y. Carboxylic acid resins of this type are marketed under the trade names Amberlite IRC–50, Duolite CS–101, or Ionac C–270. In accordance with a preferred procedure for contacting the neutralized beer with the cation exchange resin, the beer is pumped downflow through a packed column of the resin.

The adsorbed actinospectacin is eluted from the cation exchange resin as the sulfate salt. Elution is effected by charging the resin column with a suitable volume of water (enough is used to produce a slurry with the resin) and acidifying with sulfuric acid. The acid is added batchwise with vigorous mixing of the slurry until the pH of the mixture is maintained at about pH 1 to 4, preferably about pH 1.5 to 2.0 The acid solution is then drained from the resin and the column is blown dry with air under pressure. If desired, the elution can be repeated in order to obtain further yield of actinospectacin from the resin. The eluate is neutralized to about pH 6 to 7 with base, e.g., sodium hydroxide, sodium carbonate, and the like or with a basic anion exchange resin so as to remove excess acid over that necessary to form the actinospectacin sulfate. Suitable anion exchange resins for this purpose are obtained by chloromethylating by the procedure given on pages 88 and 97 of Kunin, supra, polystyrene cross-linked, if desired, with divinylbenzene prepared by the procedure given on page 84 of Kunin, supra, and reacting with trimethylamine, dimethylamine, or dimethylethanolamine, by the procedure given on page 97 of Kunin, supra. Anion exchange resins of this type are marketed under the trade-names Dowex 1, Dowex 2, Dowex 3, Dowex 21K, Ionac A–300, Amberlite IRA–400, Amberlite JR–45, Duolite A–102, and Duolite A–2, A–4, or A–6. After neutralization, the eluate is filtered and then concentrated for crystallization.

Although the advantages of methanol for crystallizing actinospectacin sulfate can be realized over a range of actinospectacin sulfate concentrations and proportions of methanol, the following guides for use of the invention are presented. In general, the advantages of the invention are realized when about 3 to 5, preferably, about 4 volumes of methanol is added to a concentrated eluate or aqueous solution assaying from about 25,000 to about 80,000γ of actinospectacin activity per ml., preferably, 30,000 to 60,000 γ/ml. of actinospectacin activity. Advantageously, the methanol is added as rapidly as possible with vigorous stirring and the mixture is filtered immediately in order to remove precipitated materials before crystallization of actinospectacin sulfate begins. Crystallization of the actinospectacin sulfate takes place readily at about 20° to 50° C. Reducing the temperature to about 0° to 15° C. before filtration improves the yield. It will be understood of course that the proportions of methanol effective for crystallization will vary inversely with the concentration of actinospectacin sulfate and the presence or absence of inactive substances. Hence, 5 or even more volumes of methanol can be used for crystallization from concentrates containing less than about 25,000 $\gamma$/ml. of actinospectacin sulfate; and conversely, two volumes or less of methanol can be used when crystallization is to be effected from concentrations higher than about 100,000 $\gamma$/ml.

If desired, the actinospectacin sulfate thus obtained can be recrystallized by dissolving in water, adding a lower-alkanone, for example, acetone or methyl ethyl ketone and crystallizing. The crystals are recovered on a filter, washed with aqueous alkanone solution, and, if desired, with anhydrous alkanone and then dried.

The following preparations and examples are illustrative of the process and products of the present invention, but are not to be construed as limiting. Unless otherwise specified, parts and percentages are by weight.

PREPARATION I.—CONCENTRATE CONTAINING ACTINOSPECTACIN SULFATE FROM WHOLE BEER 19,700 gals. of whole beer obtained according to the procedure of Belgian Patent No. 596,175 from a culture of *Streptomyces spectabilis* was acidified to pH 3.0 with 120 gals. of 60% aqueous sulfuric acid and filtered. The filtered beer was adjusted to pH 6.0 with 28 gals. of 50% aqueous sodium hydroxide and 900 lbs. (4.0 mg./ml.) of ethylenediamine tetraacetic acid was added. After thorough mixing, the pH of the beer was readjusted to pH 6.6 with 76 gals. of 50% aqueous sodium hydroxide. The neutralized beer was then polished with filter aid and contacted downflow through two chromatographic columns (lead and trail columns, in series) each containing about 250 gals. of a carboxylic acid resin in the hydrogen form. The particular resin used was a 16 to 50 U.S. mesh bead resin obtained by the suspension polymerization of 95 parts acrylic acid and 5 parts divinylbenzene in the presence of 1 part of benzoyl peroxide according to Kunin, supra. The flow rate was 50 gals. per min. except the final 20% when the rate decreased to about 41 gals. per min. The columns were washed with 500 gals. of deionized water and blown dry. For elution, the lead column was disconnected from the trail column, charged with 125 gals. of deionized water, and acidified with 30.4 l. of about 96% sulfuric acid (C.P.) to pH 1.8. The eluate containing actinospectacin as the sulfate salt was drained from the column and the column of resin was blown dry. The elution was repeated with 125 gals. of deionized water. The eluates were combined and excess sulfuric acid was neutralized with 80 gals. of a mixed base quaternary and tertiary amine anion exchange resin in the hydroxyl form having a capacity of about 7.4 milliequivalents per gram. (The particular resin used was prepared by reacting chloromethylated uncrosslinked polystyrene beads of 20 to 50 U.S. mesh with dimethyl- and trimethylamine (ca. 1:1) according to the procedure of Kunin, supra.) After filtering to remove the resin, the neutralized eluate (pH 5.75) was concentrated to an actinospectacin activity of 32,000 $\gamma$/ml. against *K. pneumoniae*.

*Example 1*

A quantity (230 l.) of concentrated eluate (Preparation I, above) was adjusted to a temperature of 20° C. and mixed with 920 l. of methanol over an interval of 20 min. with continuous stirring. The temperature of the mixture increased to 27° C. during the methanol addition. A precipitate began to form and the mixture was filtered immediately. The filter cake was washed with 20 l. of a 4:1 methanol:water solution (by volume) which was added to the filtrate and the cake was discarded. The filtrate was stirred intermittently for 4 hrs. at about 25° C. and then cooled to 0° to 5° C. After holding overnight, the crystals of actinospectacin sulfate that had formed were recovered on a filter, washed with the 4:1 methanol:water solution, finally washed with cold methanol, and dried at 30° C. under reduced pressure. There was thus obtained 5555 g. of actinospectacin sulfate assaying 875 $\gamma$/mg. against *K. pneumoniae*.

*Example 2*

A quantity (165 l.) of a concentrated eluate (prepared as in Preparation I, above) having an actinospectacin activity of 58,500 $\gamma$/ml. against *K. pneumoniae* was transferred to a large tank and the containers were rinsed with enough water to bring the total volume to 200 l. The temperature of the solution was adjusted to 20° C., and 800 l. of methanol at 20° C. was added with stirring over an interval of 40 minutes. During the addition, the temperature of the mixture increased to 25° C. The mixture was then filtered over an interval of 45 minutes, and the filter cake was washed with 20 l. of a methanol:water solution (4 parts methanol:1 part water, by volume). Crystallization began immediately in the combined filtrate and wash, and the crystallizing mixture was stirred intermittently for 4 hours at about 25° C. After cooling to 0° to 5° C. and holding overnight, the crystals of actinospectacin sulfate were recovered on a filter. The crystals were washed with about 5 l. of the methanol:water mixture, washed finally with cold methanol, and dried at 30° C. under reduced pressure. There was thus obtained 4300 g. of actinospectacin sulfate assaying 750 $\gamma$/mg. against *K. pneumoniae*.

PREPARATION II.—CONCENTRATE CONTAINING ACTINOSPECTACIN SULFATE FROM WHOLE BEER 24,500 gals. of whole beer obtained according to the procedure of Belgian Patent No. 596,175 from a culture of *Streptomyces spectabilis* was acidified to pH 2.8 with 153 gals. of 48.5° Bé. sulfuric acid and filtered with filter aid. The filtered beer was adjusted to about pH 6 with 47 gals. of 50% aqueous sodium hydroxide and 792 lbs. (approximately 4.0 mg. per ml.) of ethylenediamine tetraacetic acid was added. After thorough mixing, the beer was readjusted to about pH 6.5 to about pH 6.9 with 25.5 gals. of 50% aqueous sodium hydroxide. The neutralized beer was then polished with filter aid and contacted downflow through a carboxylic acid resin (hydrogen form) in two chromatographic columns (lead and trail columns connected in series) each containing about 250 gals. of resin. (The particular resin used was a 16 to 50 U.S. mesh bead resin obtained by the suspension polymeriaztion of 95 parts acrylic acid and 5 parts divinylbenzene in the presence of 1 part of benzoyl peroxide according to Kunin, supra.) The columns were then washed with 500 gals. of deionized water and blown dry. For elution, the lead column was disconnected from the trail column, charged with 150 gals. of deionized water, and acidified with 9 gals. of about 96% sulfuric acid (C.P.) to about pH 1.8. The eluate containing actinospectacin as the sulfate salt was drained from the column and the column was blown dry. Elution was repeated with 125 gals. of deionized water. The eluates were combined and excess sulfuric acid was neutralized with 4.5 gals. of 50% aqueous sodium hydroxide to give about 275 gals. of eluate assaying about 32,000 $\gamma$/ml. of actionspectacin activity.

*Example 3*

The lead column eluate from Preparation II, above, was divided into two 135-gal. portions and each portion was thoroughly mixed with 540 gals. of methanol. Immediately and without delay, the mixture was filtered, and the filtrate was held at about 25° C. with stirring for about 12 hrs. Since crystallization was slow to start, the filtrate was cooled to about 12° C. and held until crystallization was complete. The crystals were recovered on a filter, slurried with 75 gals. of a methanol-water mixture (60 gals. methanol to 15 gals. deionized water), collected on a filter, and washed with 60 gals. of acetone. The 24.8 kg. of moist crystals thus obtained was dissolved in 32 gals. of deionized water, the solution was warmed to 50° C., 26 gals. of acetone was added, and the mixture was stirred for 30 min. The crystallizing mixture was then cooled to 12° C. and filtered. The crystallizing tank and crystals were washed with 9 gals. of a mixture of 5 gals. of acetone and 4 gals. of water. The tank and crystals were then washed with 5 gals. of acetone, and the crystals were dried at 35° C. for 48 hrs. There was thus obtained 15.4 kg. of crystalline actinospectacin sulfate assaying 650 γ/mg. against *K. pneumoniae*.

I claim:

1. The process for crystallizing actinospectacin sulfate from aqueous solution containing the same which comprises adding methanol in sufficient quantity to the solution at about pH 6 to about pH 7 to crystallize the actinospectacin sulfate and recovering the crystals of actinospectacin sulfate thus formed.

2. The process for crystallizing actinospectacin sulfate from aqueous concentrates assaying from about 25,000 to about 80,000 γ/ml. of actinospectacin activity which comprises adding about 3 to about 5 parts of methanol to 1 part of the aqueous concentrate at about pH 6 to about pH 7, immediately filtering to remove any precipitate, allowing the actinospectacin sulfate to crystallize, and recovering the crystals of actinospectacin sulfate thus formed.

3. The process according to claim 2 wherein the aqueous concentrate assays from 30,000 to 60,000 γ/ml. of actinospectacin activity as actinospectacin sulfate.

4. The process for crystallizing actinospectacin sulfate from aqueous solutions containing the same which comprises adding about 3 to about 5 parts of methanol to 1 part of the aqueous solution at about pH 6 to about pH 7, immediately filtering to remove any precipitate, allowing the actinospectacin sulfate to crystallize at a temperature between 20° C. and 50° C., and recovering the crystals of actinospectacin sulfate thus formed at a temperature between 0° C. and 15° C.

References Cited by the Examiner

UNITED STATES PATENTS 2,550,939   5/1951   Richardson et al. _____ 167—65

OTHER REFERENCES

Hokoku: Scientific Research Institute of Tokyo, vol. 32, pp. 218–220, 1956.

JULIAN S. LEVITT, *Primary Examiner.*

MORRIS O. WOLK, *Examiner.*

E. FRANK, *Assistant Examiner.*

UNITED STATES PATENT OFFICE
CERTIFICATE OF CORRECTION

Patent No. 3,272,706  September 13, 1966

Vincent J. Peters

It is hereby certified that error appears in the above numbered patent requiring correction and that the said Letters Patent should read as corrected below.

Column 1, line 71, for "strong oxidizing mineral" read -- strong, nonoxidizing mineral --.

Signed and sealed this 29th day of August 1967.

(SEAL)
Attest:

ERNEST W. SWIDER
Attesting Officer

EDWARD J. BRENNER
Commissioner of Patents